(12) United States Patent
Rameshni et al.

(10) Patent No.: US 8,440,160 B1
(45) Date of Patent: May 14, 2013

(54) INTEGRATED SULFUR RECOVERY METHODS IN POWER PLANTS AND LOW BTU GAS FIELDS

(76) Inventors: Mahin Rameshni, Monrovia, CA (US); Stephen L. Santo, La Crescenta, CA (US)

( * ) Notice: Subject to any disclaimer, the term of this patent is extended or adjusted under 35 U.S.C. 154(b) by 0 days.

(21) Appl. No.: 13/345,435

(22) Filed: Jan. 6, 2012

(51) Int. Cl.
*C01B 17/04* (2006.01)

(52) U.S. Cl.
USPC .................................. 423/574.1; 423/576.8

(58) Field of Classification Search ................ 423/574.1, 423/576.8
See application file for complete search history.

(56) References Cited

U.S. PATENT DOCUMENTS 6,776,974 B1 * 8/2004 Burmaster et al. ......... 423/574.1
2011/0300059 A1 * 12/2011 Zhai et al. ................. 423/574.1

* cited by examiner

*Primary Examiner* — Timothy Vanoy

(57) ABSTRACT

This disclosure relates generally to processes for the production of elemental sulfur from Syngas, in the power plant, or Low BTU Gas fields and more particularly to processes the mixture of the 100% syngas or low BTU stream with the 100% SO2 recycle gas; with an additional stream comprising oxygen such as air, oxygen-enriched air, or substantially pure oxygen is added to the SO2 recycle stream prior entering the Claus reactor for producing elemental sulfur. The combination of innovation schemes comprises the sulfur recovery unit, the SO2 recovery unit and the gas turbines or boilers to promote a cost effective options by reducing the number of steps in an efficient manner and to achieve near 100% sulfur recovery with significant cost and energy saving. The SO2 gas is recycled from the SO2 recovery unit to the sulfur recovery unit by using one of the regenerable solvent.

20 Claims, 4 Drawing Sheets

INTEGRATED SULFUR RECOVERY METHODS IN POWER PLANTS AND LOW BTU GAS FIELDS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING

Not Applicable

REFERENCE TO A TABLE

Not Applicable

REFERENCE TO A COMPUTER PROGRAM LISTING COMPACT DISK APPENDIX

Not Applicable

BACKGROUND OF THE INVENTION

This disclosure relates generally to processes for the production of elemental sulfur from Syngas, in the power plant, or Low BTU Gas fields and more particularly to processes the mixture of the 100% syngas stream with the 100% SO2 recycle gas; with an additional stream comprising oxygen such as air, oxygen-enriched air, or substantially pure oxygen is added to the SO2 recycle stream prior entering the Claus reactor for producing elemental sulfur. The combination of innovation schemes comprises the sulfur recovery unit, the SO2 recovery unit and the gas turbines or boilers to promote a cost effective options by reducing the number of steps in an efficient manner and to achieve near 100% sulfur recovery with significant cost and energy saving. The SO2 gas is recycled from the SO2 recovery unit to the sulfur recovery unit by using one of the regenerable solvent. With further aspects of the present invention, the innovation scheme is a combination of the 3 process units; where the Claus unit scheme, followed by two units in any sequence order of the SO2 recovery unit and the gas turbines or boilers.

DESCRIPTION OF THE RELATED ART

Gasification technology in power generation is in no way new, but today it has become necessary to achieve environmental and economic improvement. Typical raw materials for gasification include coal, petroleum based materials (crude oil, high-sulfur fuel oil, petroleum coke, and other refinery residuals), gases, or materials that would otherwise be disposed of as waste. The feedstock is fed to the gasifier with steam and oxygen at high temperature and pressure in a reducing (oxygen-deprived) atmosphere to generate the syngas.

The raw gasification materials enter the gasifier with oxygen to burn the gas and also to remove the slag. The gas leaving the gasifier enters the Syngas cooler to recover the heat by producing steam. The cooled Syngas enters the acid gas removal unit to remove H2S and sulfur compounds. In the conventional Integrated Gasification Combined Cycle Unit the Syngas flows to the acid gas removal using amine chemical solvents such as MDEA or similar or physical solvents such as (Selexol or similar) or Rectisol unit with large solvent circulation and large energy consumption is required to enrich the acid gas.

The treated gas from the acid gas removal unit flows to the Gas turbines or boilers to produce electric power and the heat is recovered by producing steam where the steam will be used in the gas turbines or boilers. The rich gas flows to the conventional sulfur recovery to remove sulfur components followed by a tail gas treating unit to meet the environmental regulations. Additional units may be required for Sox and NOx removal by others. The overall energy consumption is high, and meeting environmental regulations are costly.

The gasification process converts carbon into a synthesis gas (syngas). Syngas is composed primarily of carbon monoxide and hydrogen, which can be used as a fuel to generate electricity, steam, or to be used as a feedstock for a number of industrial products. Gasification adds value to low-value feedstocks by converting them to marketable fuels and products. Gasification technologies differ in many ways, but share certain general production characteristics.

The high temperature in the gasifier converts the inorganic materials in the feeds tock (such as ash and metals) into a vitrified material often referred to as slag. Slag is inert and has a variety of uses in the construction and building industries. Gas treatment facilities process the raw syngas using proven commercial technologies. Impurities are removed from the syngas and are either recirculated to the gasifier or recovered. Sulfur is recovered in sulfur recovery units either in its elemental form or as sulfuric acid. If the syngas is used to produce electricity, it is typically used to fuel an IGCC power generation unit.

IGCC is the cleanest, most efficient means of producing electricity from coal, petroleum residues, and other low-value feedstock. The combined cycle unit has two basic components. A high-efficiency gas turbines, widely used in power generation today, burns the clean syngas to produce electricity. Heat recovery steam generators (HRSG) use exhaust heat from the gas turbines or boilers to produce high-pressure steam. This steam is then used to power traditional high-efficiency steam turbines.

Coal currently provides about 40 percent of world electricity and fast-paced growth in its use is projected for many countries, particularly among Asian economies.

Coal gasification produces synthesis gas (primarily a mixture of H2 and CO), which can be converted into electricity, hydrogen, substitute natural gas, and other clean fuels, as well as high value chemicals to meet specific market needs. Furthermore, while other sources of power may fluctuate, gasification systems operate on the low-cost, widely available, domestic feedstock of coal, and can be run on coal-biomass mixtures by using coal gasification to make hydrogen and then power, coal can be converted into electricity with a much smaller carbon footprint and significantly reduced contaminant emissions than typical for conventional power plants. For instance, a power plant run on clean hydrogen will only produce water as the flue gas. Coal gasification can also be used to co-produce clean power and chemicals or liquid fuels.

In order for a gasifier to be integrated with a combined cycle power plant, the syngas must first be cleaned of contaminants that could damage the turbines or contribute to environmental emissions. Typical syngas contaminants that need to be removed include particulates, sulfur gases (primarily H2S and COS), ammonia, hydrogen cyanide, hydrogen chloride, alkali, and heavy metals. Conventional gas cleaning techniques typically require aqueous quenching and cooling of the syngas to around 100° F., followed by scrubbing using chemical or physical solvents, and finally absorption/adsorption of trace contaminants on solid sorbents.

Removal of Hydrogen Sulfide, U.S. Pat. No. 5,304,361, April 1994, by Paul Parisi, and Saint Lambert, describes a portion of the acid gas flows to the reaction furnace in the sulfur plant and another portion is sent to the tail gas incineration and only the incinerated portion is recycled to the reaction furnace, while in this new invention the sour gas refers to syngas and Low BTU gas fields application, in addition, 100% of the sour gas (Syngas or Low BTU Gas) and 100% of the SO2 recycle streams are mixed prior entering the Claus reactor, in other words, in the new invention, the gas stream is not split, some steps such as the reaction furnace and the tail gas treating and the tail gas incineration units are eliminated and the employed equipment are smaller size, as the results, the new invention provides significant energy and cost saving in both capital and operating costs.

In accordance to the new invention, the full stream of the syngas from the power plant or Low BTU gas fields is mixed with the full SO2 stream recycle from the SO2 recovery unit and flows to the Claus reactor directly through a heater to produce sulfur and the tail gas flows to the SO2 recovery unit to recover the SO2 where it is recycled to the sulfur recovery unit and the treated gas flows to the gas turbines or boilers to generate power. With further aspects of the present invention, the tail gas can flow to the gas turbines or boilers first then to the SO2 recovery unit where the SO2 is recycled to the sulfur recovery unit.

In accordance to the new invention, the syngas will not be processed in any acid gas removal, in other words some steps such as acid gas removal, tail gas treating, syngas coolers, and the tail gas incineration units are eliminated.

The new invention will enhance the performance of gasification systems to make them cost competitive with alternative processes (e.g., pulverized coal power generation, natural gas combined cycle), thus enticing U.S. industry to implement the environmentally superior gasification based processes. The enhancements sought will improve economics, improve gasification plant efficiency, improve process environmental performance (including carbon emission reduction), and increase process reliability.

With further aspects of the present innovation, there are many gas fields around the world that holds the Low BTU Gas which contains a very large gas volume and it is not economical to process the gas by using conventional methods to meet the pipeline specifications. The flue Low-BTU Gas is Sour and it is a non-associated gas containing the gas streams of high CO2, high H2S, and high N2. The gas has to be transported to other locations or facilities to remove high H2S, high Nitrogen and high CO2 content but due to a large gas volumetric it is not practical nor economical. The best optimum way is to install a power plant at the gas field site to generate power by using the scheme of this invention.

The new desulfurization invention can be integrated to process the Low BTU gas fields and to achieve the highest possible efficiency and optimization and it is very cost effective.

This application for patent discloses integrated processes for desulfurization of gas streams in the power plants and gas fields containing Low BTU gases to elemental sulfur in combination of the 3 process units which is a different arrangement from the conventional method.

Some steps such as the conventional acid gas removal unit, syngas coolers, the tail gas treating and the tail gas incineration units are eliminated; instead, the syngas or low BTU gas flows directly to the new invention 3 process units configuration of the sulfur recovery to remove sulfur. The tail gas from the sulfur recovery is processed in the regenerable SO2 removal where the SO2 gas is recycled to the sulfur recovery unit and the treated gas enters the gas turbines or boilers to generate electricity. The treated gas leaving the third process unit can be emitted to the atmosphere if it is safe or other units. Further aspects of the present invention, the two process units after the sulfur recovery unit can be in any sequence order, it is preferred to have the SO2 recovery unit as the second process unit and the gas turbines or boilers as the third process unit where the gas turbines or boilers are commercially standard.

The SO2 regenerable unit could be ClausMater™, Cansolv™, Labsorb™, Elsorb™, TurboSox™, well-man Lord, and ENFI organic SO2 solvent and or similar processes.

BRIEF SUMMARY OF THE INVENTION

The present invention relates to a process for recovering sulfur from the syngas streams from the power plants or Low BTU Gas Fields where the sulfur recovery is followed by the SO2 recovery unit and the gas turbines or boilers in either sequence order. More particularly the 100% syngas and the 100% SO2 recycle gas are mixed first plus air, oxygen or enriched air is added to the SO2 recycle stream and flow directly to a Claus reactor. The SO2 gas is recycled from the SO2 recovery unit using one of the commercial regenerable solvent. Key advantages are some steps such as the acid gas removal unit, syngas coolers, tail gas treating and the tail gas incineration units are eliminated, reduced energy significantly and reasonable operating and capital costs with overall near 100% sulfur recovery with SO2 recycled to the sulfur plants and to meet the new environmental regulations.

The integrated three process units are the sulfur recovery unit followed by the SO2 recovery unit first and then is followed by the gas turbines or boilers. Further aspects to this invention where the sulfur recovery unit followed by the gas turbines or boilers and then is followed by the SO2 recovery unit and are shown as the FIG. 1 and the FIG. 2.

In accordance to the new invention, the 100% of the syngas in the power plant or 100% Low BTU Gas fields is mixed with the 100% of the SO2 stream recycle from the SO2 recovery plus air, oxygen or enriched air and then flows to the Claus reactor through a heater to produce elemental sulfur.

In accordance with aspects of the present invention, the process comprises at least 3 process units: first a unique scheme of Claus unit, and the other 2 process units; an SO2 recovery flue gas desulfurization unit using regenerable solvent to recover and to recycle the SO2 stream to the Claus unit and the gas turbines or boilers to generate power where the 2 last process units can be in either sequence order.

In accordance with further aspects of the present invention, recovery of the sulfur can be accomplished by processing the 100% syngas along with a stoichiometric 100% quantity of SO2 gas from the SO2 recovery unit or flue gas desulfurization unit to a Sulfur Converter—a single or more catalytic reactor(s) containing a bed of one or more Claus catalyst(s). In the Converter, the H2S in the feed gas reacts with SO2 to form elemental sulfur via the Claus reaction:

$$2H2S+SO2 \rightarrow 3S+2H2O \tag{1}$$

The additional H2S or any other sulfur component reacts with oxygen and produce SO2 prior entering to the SO2 recovery unit.

In accordance with one embodiment addition of the present invention, the syngas is heated indirectly with HP steam or any type of heaters to about 450° F. before entering the reactor to avoid condensing the sulfur product on the catalyst. The Claus reaction is exothermic and creates a temperature rise across the catalyst bed. In order to maintain a reasonably low reactor outlet temperature (less than 650° F.), cooled tail gas is recycled to the inlet of with an ejector that uses the high-pressure sour feed gas as the motive fluid or by recycle blower.

The reactor Light hydrocarbons (C1-C3) present in sour feed gas will not react in the relatively low temperature of the Sulfur Converter. However, heavy hydrocarbons, especially aromatics such as BTX, if present, may crack and deactivate the catalyst. To account for the possibility of some heavy hydrocarbon contamination, it is recommended to provide polishing units such as activated carbon bed or similar units to capture the hydrocarbon impurities.

In accordance with embodiment of the present invention, the converter effluent is cooled to about 350° F. in the Sulfur Condenser by generating low pressure (LP) steam. The condensed sulfur is drained through a barometric seal to a below-ground Sulfur Pit. The liquid sulfur removed from the process gas stream in each condenser contains dissolved H2S in the form of hydrogen polysulfide (H2SX) and H2S in equilibrium with the process gas. The pit receives liquid sulfur from the sulfur condenser at about 350° F. To cool the sulfur down to 300° F., the optimal temperature for degassing, the sulfur passes through the cooling section of the Sulfur Pit in which sulfur cools down by contact with the coil of the Sulfur Cooler. BFW passes through the coil of the Sulfur Cooler, preheating it before feeding the Sulfur Condenser. The cooled sulfur flows and enters the degassing inside or outside of the pit upon technology selection.

In further accordance with aspects of the present disclosure, the activated catalyst in the Claus reactor(s) is an alumina, titania, or a mixed bed with alumina on the top and a layer of titania and/or direct oxidation catalyst such as Selectox or similar which promotes a Claus reaction in the reactor, and by supplying oxygen to the reactor.

In further accordance with the present disclosure, residual effluent streams comprising $H_2S$ and/or SO2 may be further contacted with one or more additional catalytic process stages including but not limited to sub dew point reactors and sub dew point reactors with internal cooling in order to produce additional elemental sulfur. Such additional catalytic process stages may employ alumina and/or titania, or direct oxidation catalysts or their equivalents.

In accordance with another embodiment of the present invention, the tail gas stream leaving the sulfur recovery unit flows to the second and third units in either order. If the second unit is the gas turbines or boilers. Since the gas stream is still contains sulfur compounds such as H2S, the material of construction of the boilers should be adequate to handle the tail gas streams. The tail gas stream is combusted and all the sulfur compounds are converted to SO2 and the combusted heat is recovered by producing high pressure of steam. If the boilers are employed as the third unit, since all the sulfur components are recovered, then the material of the construction for the boilers are industry standard.

In accordance with another embodiment of the present invention, the SO2 recovery unit is the second or the third process unit. If it is the second unit, then it receives the tail from the sulfur recovery unit, and the treated gas flows to the boilers. If it is the third unit, then it receives the combusted gas stream from the gas turbines or boilers and the treated gas can be emitted to atmosphere or routed to other units if contains contaminate. In this invention, the SO2 recovery unit or flue gas desulfurization unit recovers the SO2 by using the regenerable solvent. The wet SO2 stream is recycled back to the sulfur recovery unit. If the combusted gas contains NOx, the SO2 recovery unit might be able to remove the NOx upon solvent selection otherwise additional unit might be required by others.

The SO2 recovery unit could be ClausMater™, Cansolv™, Labsorb™, Elsorb™, TurboSox™, well-man Lord, and ENFI organic SO2 solvent and or similar processes.

BRIEF DESCRIPTION OF THE DRAWINGS

The following figures are part of the present disclosure and are included to further illustrate certain aspects of the present invention. Aspects of the invention may be understood by reference to one or more figures in combination with the detailed written description of specific embodiments presented herein.

Figure 1:
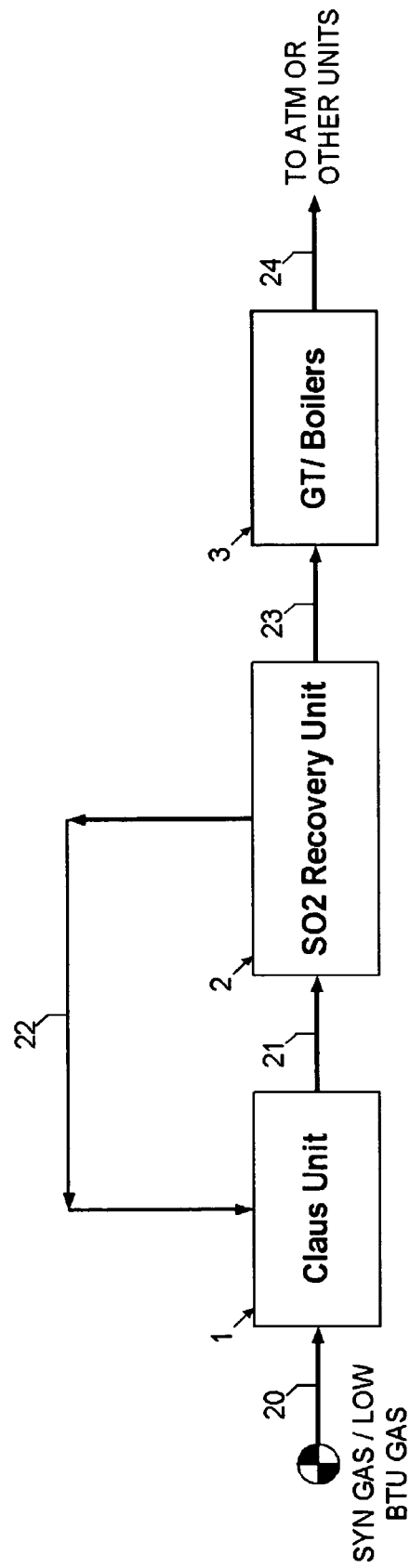
FIG. 1 illustrates a schematic block flow diagram of an embodiment of the present disclosure, where the integrated three process units are the sulfur recovery unit followed by the SO2 recovery unit and then is followed by the gas turbines or boilers where the SO2 stream is recycled from the SO2 recovery unit to the SRU unit. The detailed of each unit is described as FIG. 3 in this invention.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or the scope of the inventive concepts or the appended claims in any manner. Rather, the figures and detailed written descriptions are provided to illustrate the inventive concepts to a person of ordinary skill in the art and enable such person to make and use the inventive concepts.

DETAILED DESCRIPTION OF THE INVENTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicant has created new processes of sulfur recovery unit from the syngas in the power plants and from the Low BTU Gas fields by reducing some steps compare to the conventional gasification and Low BTU gas fields schemes as well reduction in the employed units sizes and in both reasonable economic costs and energy savings as well as complying with the environmental regulations.

The present invention relates to processes for recovering sulfur from the syngas in the power plants and from the Low BTU Gas Fields with innovation sulfur recovery scheme and followed with innovation integrated scheme of two process units; the SO2 recovery units and the gas turbines or boilers in any sequence order. The 100% of the syngas stream or Low BTU gas is mixed with 100% of the SO2 recycle stream and plus air, oxygen or enriched air then flows to the Claus reactor.

Key advantages of the processes described herein include in the gasification application by eliminating some of the steps such as acid gas removal, large syngas coolers and eliminating the tail gas treating units, and the tail gas incineration. Instead the innovation of the unique scheme for the sulfur recovery unit with less equipment, which reduces the energy consumptions. In the Low BTU Gas Fields, to eliminate transferring very large gas volumes from the gas fields to the site for processing with unrealistic pipeline and to eliminate processing the gas in the conventional methods with having many large process units involved are not economical by virtue to meet the pipeline specifications. Instead the new invention process scheme can be employed at the gas filed where no need to transfer the gas to the site, with less process units, less equipment, with significant saving on energy consumption, and significant saving on capital and operating costs.

In accordance with aspects of the present invention, it is an object of the present disclosure to provide a process for producing elemental sulfur from syngas in the power plant and from the Low BTU Gas Fields in high overall recovery yields, and with a minimum number of process steps. A further object of the present disclosure it to provide such a process which results in a minimum number of formed byproducts, which would otherwise require further treatment and/or disposal.

A further object of the present disclosure is the provision of an efficient process for converting gases such as syngas or Low BTU Gas to elemental sulfur in amounts required in, and economically acceptable for, present day industrial operations. Another object is to provide such a process which can tolerate variances in operating conditions within a given range without major equipment adaptations. A further object is to provide a process which can be utilized in co-acting phases to provide, at acceptable economics, the capacity required in present-day industrial operations.

In the discussion of the Figures, the same or similar numbers will be used throughout to refer to the same or similar components. Not all valves and the like necessary for the performance of the process have been shown in the interest of conciseness. Additionally, it will be recognized that alternative methods of temperature control, mixing devices such as injection oxygen quill, heating and cooling of the process streams are known to those of skill in the art, and may be employed in the processes of the present invention, without deviating from the disclosed inventions.

In accordance to this invention, the sour gas which can come from any number of suitable sources, including but not limited to the numerous gases emanating from power plants involving where typical raw materials for gasification include coal, petroleum based materials (crude oil, high-sulfur fuel oil, petroleum coke, and other refinery residuals), gases, or materials that would otherwise be disposed of as waste and also from the gas fields which contains Low BTU Gas characteristics.

In accordance to this invention, the presented scheme comprises very small amount of CO2 pick up because the Solvent are used in the SO2 recovery unit do not absorb the CO2 which provides the significant advantages for carbon capture in regard to environmental regulations.

In accordance to this invention, a unique scheme of the sulfur recovery unit operates at much higher pressure compare to conventional sulfur recovery unit because the syngas operating pressure or low BTU gas operating pressure is normally about 300 psi and 1000 psi respectively; therefore this invention considers up to 2000 psi.

The operating pressure of the wet SO2 recycle from the SO2 recovery unit to the sulfur recovery unit is atmospheric pressure which requires a SO2 compressor to boost the pressure up to 2000 psi.

In accordance to this invention, the operating pressure of air, oxygen, or enriched air is the same as the syngas or low BTU gas stream, therefore, therefore the operating pressure is boosted to up to 2000 psi.

Turning now to the figures, in FIG. 1, the syngas stream from the power plant or the Low BTU gas from the gas fields (20) enters the Claus unit (1), the 100% wet SO2 stream (22) is also recycled to the Claus unit (1). The stream 21 from the Claus unit (1) enters the SO2 Recovery Unit (2) to recover the SO2. The treated gas, stream (23) from the SO2 Recovery Unit (2) flows to GT/Boilers (3) to recover the energy and the gas stream (24) flows to the atmosphere or other units. The detailed of each unit of the FIG. 1 are shown as the FIG. 3 and described in details herein.

Figure 2:
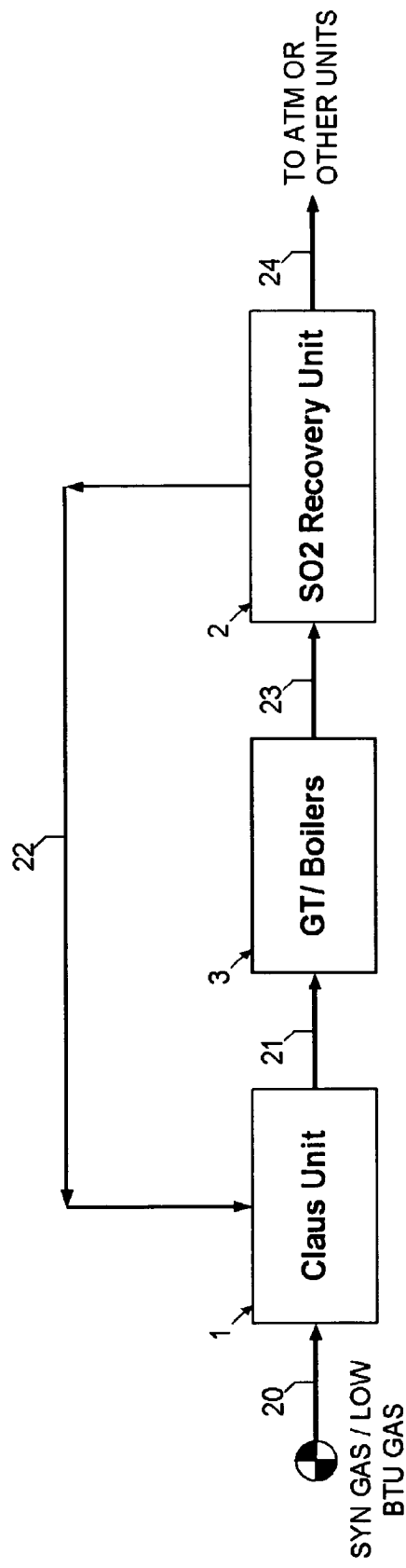
FIG. 2 illustrates a schematic block flow diagram of an embodiment of the present disclosure, where the integrated three process units are sulfur recovery unit followed by the gas turbines or boilers and then is followed by the SO2 recovery unit where the SO2 stream is recycled from the SO2 recovery unit to the SRU unit. The detailed of each unit is described as FIG. 4 in this invention.

In FIG. 2, the syngas stream from the power plant or the Low BTU gas from the gas fields (20) enters the Claus unit (1), the 100% wet SO2 stream (22) is also recycled to the Claus unit (1). The stream 21 from the Claus unit (1) enters the GT/boilers unit (3) to recover the energy. The gas stream (23) from GT/boilers flow to the SO2 Recovery Unit (2) to recover the SO2, and 100% wet SO2 stream (22) is recycled to the Claus unit (1). The gas stream (24) from the SO2 Recovery unit (2) flows to the atmosphere or other units. The detailed of each unit of the FIG. 2 are shown as the FIG. 4 and described in details herein.

Figure 3:
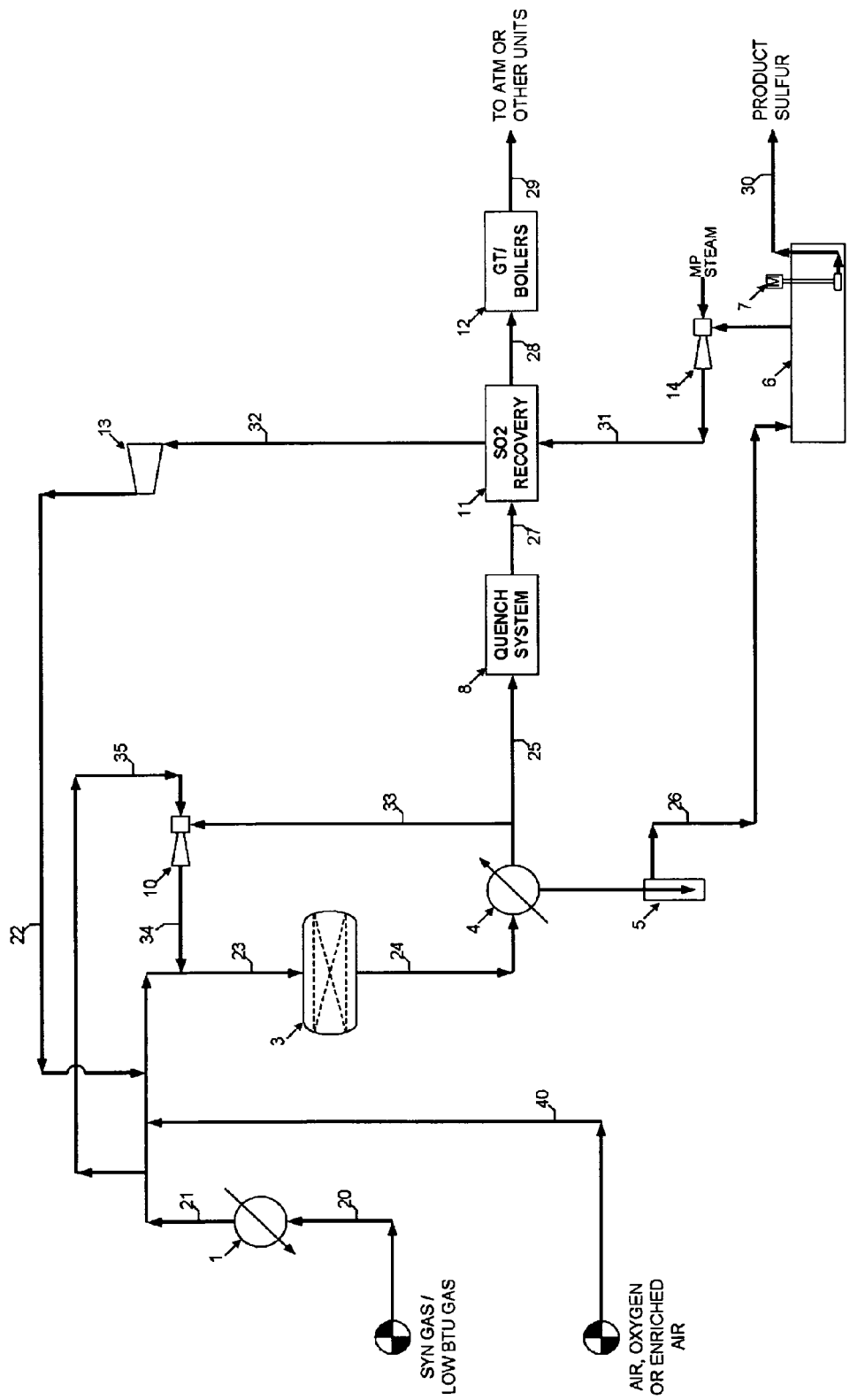
FIG. 3 illustrates a schematic diagram of an embodiment of the present disclosure, where the second process unit is the SO2 recovery unit and the third process unit is the gas turbines or boilers.

Turning now to the other figures, in FIG. 3, the syngas stream from the power plant or the Low BTU gas from the gas fields (20) enters the sour gas heater (1). The sour feed gas (20) is heated to about 450° F. before entering the reactor to avoid condensing the sulfur product on the catalyst. The heated sour gas (21) leaving the sour gas heater is mixed with 100% wet SO2 recycle stream (22) from the SO2 recovery unit (11).

The 100% wet SO2 stream (32) from the SO2 Recovery Unit (11) flows through a SO2 Compressor (13) for boosting the pressure prior recycling and mixing with the heated sour gas. An additional stream comprising oxygen such as air, oxygen-enriched air, or substantially pure oxygen (40) is added to the mixed streams of the heated gas and the SO2 recycle stream.

The wet $SO_2$ gas (22) ranging from about 1% to about 100%, which can come from any number of suitable $SO_2$ recovery units.

The air could by supplied by the air blower, oxygen from the oxygen plant in the gasification or other available sources for the gas fields low BTU gases or the oxygen can be added to the air stream to produce the enriched air for applying to the unit.

The SO2 recovery unit could be ClausMater™, Cansolv™, Labsorb™, Elsorb™, TurboSox™, well-man Lord, and ENFI organic SO2 solvent and or similar processes.

Any type of suitable reheater device or method may be employed, such as an indirect steam reheat, hot gas bypass, or inline burner or similar.

The 100% of the sour gas (syngas or Low BTU Gas, 21) is mixed with 100% of the SO2 recycle stream (22) and an additional stream comprising oxygen such as air, oxygen-enriched air, or substantially pure oxygen (40) and the mixture stream (23) flows to the first Claus reactor (3).

In the first Claus reactor (3), the H2S in the feed gas reacts with SO2 to form elemental sulfur via the Claus reaction to produce elemental sulfur and water. In addition the additional sulfur components react with oxygen to produce SO2. The Claus reaction is exothermic and creates a temperature rise across the catalyst bed. The first Claus reactor (3) is typically a carbon steel vessel with an internal lining comprising high alumina refractory or stainless steel.

In the FIG. 3 scheme, the SO2 to H2S ratio is very high and up to 10,000:1 due to recycling the 100% SO2 stream.

The mixture of the sour gas heater effluent stream (21) and the recycle SO2 stream (22) enters the first converter (3), which comprises one or more fixed bed reactors containing a catalyst.

The converters in the Claus conversion step of this present process disclosure, employ one or more Claus catalysts including alumina catalysts, activated alumina catalysts (such as S-100 SR catalysts), alumina/titania catalysts, and/or titania catalysts, direct oxidation catalysts such as Selectox or similar or any other catalyst systems which are employed in the Claus process, the catalysts having a range of surface area, pore volume, shapes (e.g., star shaped, beads, or powders), and percent catalyst content (in non-limiting example, from about 50 wt. % to about 95 wt. % $Al_2O_3$, having a purity up to about 99+%), without any limitations. The Claus processes within converter and subsequent converters, such as converter may be carried out at conventional reaction temperatures, ranging from about 200° C. to about 1300° C., and more preferably from about 240° C. to about 600° C., as well as over temperature ranges between these ranges, including from about 210° C. to about 480° C., and from about 950° C. to about 1250° C., without limitation.

The gas effluent from the sulfur condenser No. 1 may be treated in one or more additional stages, comprising a reheater, reactor and condenser to recover additional sulfur.

The last sulfur condenser in the sulfur recovery unit comprises as the quench system as one condenser, quench column, or twin (dual) condensers or could be one condenser equipped with the quench system, or a condenser with a cooler or any cooling combinations to recover sulfur vapor and to minimize vapor losses and to provide the required cooled gas temperature to the SO2 recovery unit.

The process is typically able to achieve a sulfur recovery efficiency of greater than about 80%, and preferably greater than about 90%, based on the theoretical amount of recoverable sulfur. The overall sulfur recovery with the SO2 recovery unit is near 100%.

The number of Claus conversion steps employed, which may range from one stage to more than ten, depends on the particular application and the amount of sulfur recovery required or desired. In accordance with certain non-limiting aspects of the present disclosure, the number and placement of multiple converters/reactors, and the associated condenser systems, may be adjusted without affecting the overall process described herein.

The first Claus reactor effluent (24) is cooled to about 350° F. in the Sulfur Condenser No. 1(4) by generating LP steam. The condensed sulfur (26) is drained through a barometric seal (5) such as sulfur seal or Sultrap to a below-ground Sulfur Pit (6) or other suitable vessel, located either below or above grade.

In order to maintain a reasonably low reactor outlet temperature (less than 650° F.) or to moderate the outlet temperature, a portion of the cooled tail gas (33) is recycled to the inlet of the Claus reactor (3) as stream (34) through a recycle blower or an ejector (10) that uses the high-pressure sour gas feed as the motive fluid (35). Such recycle is not a requirement if the temperature of the process is low but may provide better control of the reactor temperature over the complete operating range from turndown to maximum capacity and different feed stocks.

Turning now to the FIG. 3, the condenser No. 1 effluent gas stream (25) enters the quench system (8) wherein the gas is further cooled. The quench system can be as one condenser, quench column, or twin (dual) condensers or could be one condenser equipped with the quench system, or a condenser with a cooler to recover sulfur vapors and to minimize vapor losses and to provide the required cooled gas temperature to the SO2 recovery unit (11).

The cooled effluent stream (27) from the quench system (8) flows to the SO2 recovery unit (11).

In the SO2 recovery unit (11) the SO2 is recovered and recycled to the SRU and the treated gas (28) is sent to the gas turbines or boilers (12) for power generation.

The gas turbines or boilers (12) is designed based on industry standard including the material of construction and the gas leaving from the boilers (12) is emitted to the atmosphere or other units (29).

The sulfur pit (6) receives liquid sulfur from the sulfur condenser(s) at about 350° F. To cool the sulfur down to 300° F., the optimal temperature for degassing, the sulfur first passes through the cooling section of the Sulfur Pit in which sulfur cools down by contact with the coil of the Sulfur Cooler. Sometimes, BFW passes through the coil of the Sulfur Cooler, preheating it before feeding the Sulfur Condenser. The liquid sulfur removed from the process gas stream in each condenser contains dissolved H2S in the form of hydrogen polysulfide (H2SX) and H2S in equilibrium with the process gas. The liquid sulfur is swept with the eductor pit (14) and the vapor stream (31) also recycled to the SO2 recovery unit (11). The liquid sulfur can be degassed inside or outside of the sulfur pit upon technology selection and the vapor that is recovered from the degassing unit is also sent to the SO2 recovery unit (11 to reduce the overall emission.

As described herein, the liquid sulfur recovered by the disclosed processes (6) is typically collected in a sulfur pit or other appropriate collection device or approved location, and may remove as appropriate, such as by a sulfur pump or pump system (7) and the produced sulfur to be handled by others, or shipped as appropriate stream (30).

Light hydrocarbons (C1-C3) present in sour feed gas will not react in the relatively low temperature of the Sulfur Converter. However, heavy hydrocarbons, especially aromatics such as BTX, if present, may crack and deactivate the catalyst. To account for the possibility of some heavy hydrocarbon contamination, it is recommended to provide polishing units upstream such as activated carbon bed or similar processes to capture the impurities.

Figure 4:
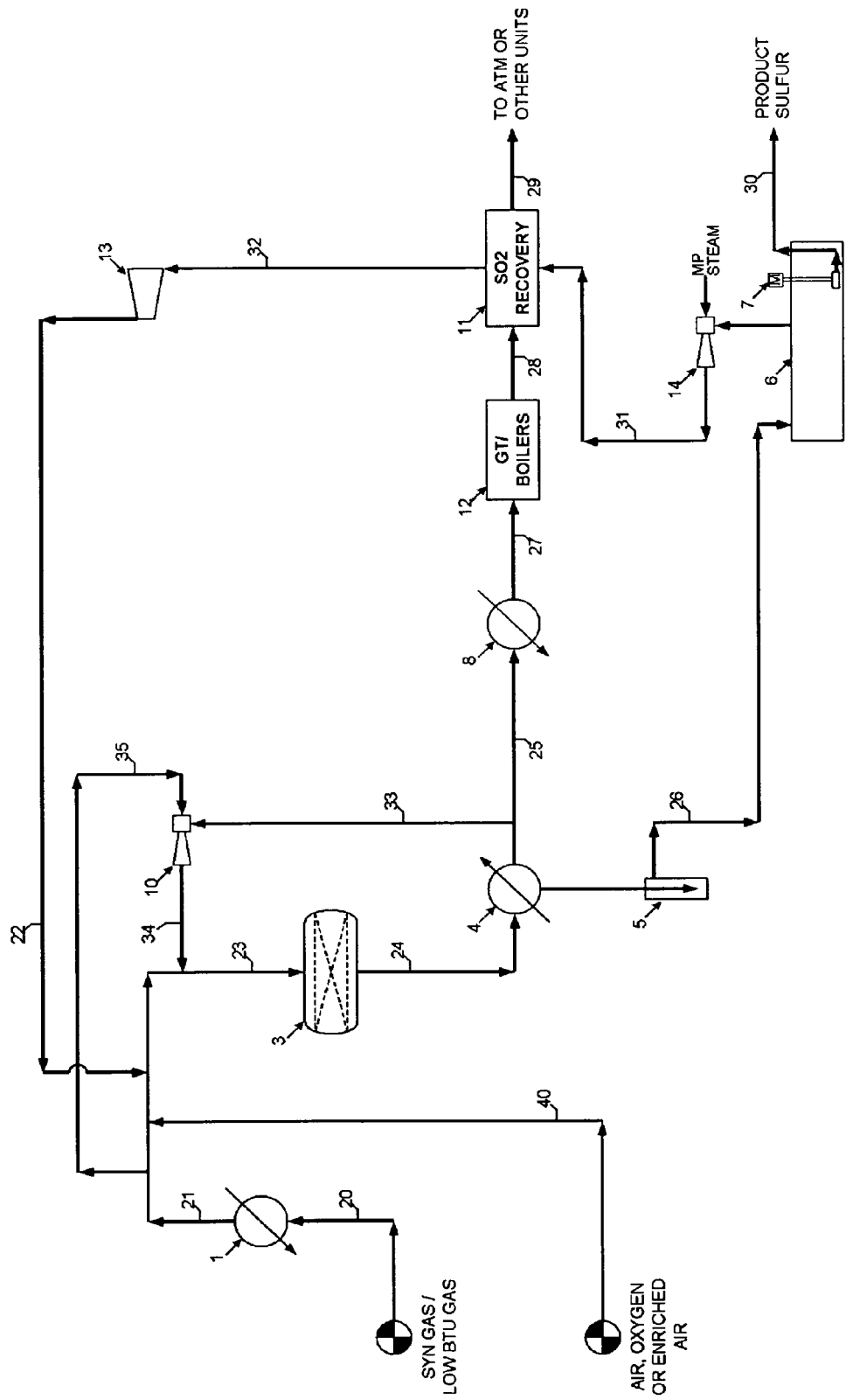
FIG. 4 illustrates a schematic diagram of an embodiment of the present disclosure, where the second process unit is the gas turbines or boilers and the third process unit is the SO2 recovery unit.

Turning now to the FIG. 4, the description of the gas stream, reheater (1), mixing with the SO2 recycle, adding air or oxygen, in the sulfur recovery, including the Claus reactor (3) and the condenser no. 1 (4) and the sulfur collection system (6) is the same as FIG. 3. Even though the 100% of the SO2 stream (22) is recycled back to the sulfur recovery unit through the SO2 compressor (13), the SO2 Recovery is located after the GT/Boilers.

The condenser No. 1 effluent gas stream (25) enters the SRU reheater No. 1 (8) wherein the gas is heated to a temperature appropriate for the reaction of $H_2S$ and $SO_2$ to form sulfur if additional Claus reactor employed and (or) the SRU reheater No. 1 effluent (27) flows to the gas turbines or boilers (12).

Any type of suitable reheater device or method may be employed, such as an indirect steam reheat, hot gas bypass, inline burner or similar.

Turning to FIG. 4, the additional stream comprising oxygen such as air, oxygen-enriched air, or substantially pure oxygen (40) is not required for all variation of the feed stocks unless the direct oxidation catalyst such as Selectox or similar is used in the first Claus reactor (3).

Further aspects of the invention in the FIG. 4, where the $H_2S$ to $SO_2$ mole ratio is adjusted automatically so as to be in a range from about 2:1 and more preferably from about 5:1 to about 20:1, although ratios outside of these ratios may be appropriate, depending upon the SO2 quantities compare to the H2S in the sour gas.

Furthermore aspects of the invention in the FIG. 4, the gas turbines or boilers (12) is located after the sulfur recovery unit, and the gas stream (27) still contains H2S, the proper material of the construction for the boilers are considered to prevent corrosion.

The boilers effluent gas (28) enters the SO2 recovery unit (11), where the SO2 stream (32) is recycled and the treated gas stream (29) flows to other units or emitted to the atmosphere.

Accordance to this invention, all other features except noted discussed in the FIG. 3 are still applied to FIG. 4.

All of the compositions, methods, processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods, processes and/or apparatus and in the steps or sequence of steps of the methods described herein without departing from the concept and scope of the invention. Additionally, it will be apparent that certain agents which are both chemically and functionally related may be substituted for the agents described herein while the same or similar results would be achieved. All such similar substitutes or modifications apparent to those skilled in the art are deemed to be within the scope and concept of the invention. The disclosed and undisclosed embodiments are not intended to limit or restrict the scope or applicability of the invention conceived of by the Applicant, but rather, in conformity with the patent laws, Applicants intends to protect all such modifications and improvements to the full extent that such falls within the scope or range of equivalents.

We claim:

1. A process for the production of sulfur from Syngas, in the power plant, or Low BTU Gas fields, the process comprising:
    With combination of three process units, sulfur recovery, SO2 recovery, and gas turbines or boilers;
    Heating the syngas or low BTU gas, then mixing with the SO2 recycle stream and adding oxygen, enriched air or air for processing in the Claus reactor;
    contacting an oxygen containing gas stream from air, oxygen-enriched air or pure oxygen with a syngas from the power plant or gas field low BTU-containing gas stream and a wet SO2 recycle-containing gas stream from the SO2 recovery unit in a first Claus reactor at an elevated temperature to produce an effluent stream comprising sulfur (S), SO2, H2S and water;
    recycling the wet SO2 stream from the SO2 recovery unit to the sulfur recovery unit;
    recovering the SO2 in the SO2 recovery unit by using one of commercial regenerable solvent;
    Moderate the outlet reactor temperature under 650 F with an ejector that uses the high-pressure sour feed gas as the motive fluid or by recycle blower;
    the pressure of the feed streams including air, oxygen or enriched air to the sulfur recovery up to 2000 psi; meaning operating the sulfur plant up to 2000 psi;
    Using gas turbines or boilers to generate the power, and,
    recovering the elemental sulfur from the product gas stream.

2. The process of claim 1, wherein the tail gas stream from the sulfur recovery unit flows to the SO2 recovery unit as the second process unit and the gas turbine or boilers as the third process unit receives the gas stream from the second unit; the SO2 recovery unit.

3. The process of claim 2, wherein The last sulfur condenser in the sulfur recovery unit comprises as the quench system as one condenser, quench column, or twin (dual) condensers or could be one condenser equipped with the quench system, or a condenser with a cooler or any cooling combinations to recover sulfur vapor and to minimize vapor losses and to provide the required cooled gas temperature to the SO2 recovery unit.

4. The process of claim 1, wherein the SO2 recycle stream to the sulfur plant is boosted by a SO2 compressor up to 2000 psi.

5. The process of claim 1, wherein the wet $SO_2$ gas ranging from about 1% to about 100%, which comes from any $SO_2$ recovery or any SO2 concentration units.

6. The process of claim 1, wherein the 100% of the sour gas (syngas or Low BTU Gas) is mixed with 100% of the SO2 recycle stream.

7. The process of claim 1, wherein, the recovering process comprises cooling the product gas stream in one or more sulfur condensers to condense and recover elemental sulfur from the product gas stream.

8. The process of claim 1, wherein, in the sulfur recovery unit, the type of the reheater device is an indirect steam reheat, hot gas bypass, or inline burner.

9. The process of claim 2, wherein the SO2 to H2S ratio is up to 10,000:1.

10. The process of claim 1, wherein the treated gas from the third process unit is emitted to the atmosphere or other units.

11. The process of claim 1, wherein, the Claus reactor comprises one or more reactors including sub dew point reactors and sub dew point reactors with internal cooling.

12. The process of claim 11, wherein, one or more typical Claus catalysts such as alumina, titanium, or direct oxidation catalyst are used in the Claus reactor(s).

13. The process of claim 1, wherein a sulfur recovery efficiency of greater than 80% and overall sulfur recovery with the SO2 recovery unit of near 100% is achieved.

14. The process of claim 1, wherein if heavy hydrocarbons presents in the sour gas, activated carbon bed or any polishing unit processes are used to capture the impurities.

15. The process of claim 1, wherein, the vapor streams from the sweeping the sulfur pit and from the sulfur degassing is recycled to the SO2 recovery unit.

16. The process of claim 1, wherein the gas effluent from the sulfur condenser No. 1 may be treated in one or more additional stages, comprising a reheater, reactor and condenser to recover additional sulfur.

17. The process of claim 1, wherein the tail gas stream from the sulfur recovery unit flows to the gas turbines or boilers as the second process unit and the SO2 recovery is the third process unit.

18. The process of claim 17, wherein the additional streams comprising air, stream, oxygen-enriched air, or substantially pure oxygen is not required for all variation of the feed stocks unless the direct oxidation catalyst is applied.

19. The process of claim 17, wherein the $H_2S$ to $SO_2$ mole ratio is adjusted automatically so as to be in a range from about 2:1 to about 20:1.

20. The process of claim 17, wherein the effluent gas stream from the condenser No. 1 flows to the No. 1 SRU reheater.

* * * * *